UNITED STATES PATENT OFFICE.

SOPHUS JORGENSEN, OF COPENHAGEN, DENMARK.

SLAG CEMENT.

SPECIFICATION forming part of Letters Patent No. 569,833, dated October 20, 1896.

Application filed November 23, 1895. Serial No. 569,940. (No specimens.)

*To all whom it may concern:*

Be it known that I, SOPHUS JORGENSEN, a citizen of Denmark, residing in Copenhagen, in the Kingdom of Denmark, have invented certain new and useful Improvements in the Manufacture of Slag Cements, of which the following is a specification.

This invention relates to improvements in the manufacture of slag cement.

The chief objections against slag cements as hitherto manufactured have been partly that they were too slow setting, by which is meant that the time occupied by the cement in acquiring its initial set or hardening is too long, and partly also that the surface of the work made in slag cement is liable to become soft and unfit for resisting the wear and tear, though the interior may keep its hardness and solidity. In these two respects the slag cement has always been inferior to the genuine Portland cements and has been unable to come into general use.

My invention is intended to overcome the objections to slag cement; and it consists, therefore, of a process of making slag cement by mixing the same with water and permitting it to set until it hardens, then cutting the hardened cement into blocks and roasting them, then grinding the roasted blocks into a fine powder, and lastly mixing the latter in suitable proportions with ordinary slag cement.

The invention consists, further, of a slag cement composed of a mixture of ordinary slag cement with hardened, roasted, and ground slag cement.

By my improved process of manufacturing the slag cement is made, as usual, by mixing finely-ground slag and pulverized slaked burnt lime. To this mixture is added a certain quantity of hardened, roasted, and ground slag cement by which the setting time of the cement can be regulated and at the same time its hardness materially improved both in the bulk of the work and especially on the surface of such work, so that it makes in all respects my improved slag cement equal to or even superior to the best Portland cements. This additional quantity of hardened, roasted, and ground slag cement is prepared as follows:

A certain quantity of ordinary slag cement is prepared and used in its modified form for being mixed continually with the ordinary slag cement. The ordinary slag cement is mixed with water and permitted to set by spreading it in a layer on a floor until it hardens sufficiently to permit it to be cut into blocks, which after several days of hardening are placed into a kiln in which they are lightly burned or roasted. By the roasting the blocks become friable. They are then ground into a fine powder which forms the addition to the ordinary slag cement. In order to show how this addition, which is very quick-setting and of great strength when set, alters and improves the slag-cement, some actual results obtained from tests made in a laboratory for testing cements are cited:

| | | | |
|---|---|---|---|
| Slag lime hydrate............................per cent.. | 90 | 80 | 70 |
| Addition ..................................do.... | 10 | 20 | 30 |
| Time of set..............................hours.. | 11 | 3 | 1 |
| Tensile strength of briquets of one cement and three sand, in pounds, per square inch: | | | |
| After seven days ............................. | 167 | 206 | 222 |
| After twenty-eight days..................... | 277 | 337 | 342 |

The mixing of the additional quantities of the hardened, roasted, and ground slag cement with the ordinary slag cement can be done in several ways by means of drum-and-balls or other mixers. The cheapest way for mixing and grinding the addition together with the two other materials which form the slag cement is to pass the materials directly through a tube-mill, which gives a very intimate mixing and at the same time a very fine grinding and which has the great advantage of working continuously, so that the materials are fed in at one end while the finished slag cement leaves the mill without interruption at the other end.

Having thus described my invention, I claim as new and desire to secure by Letters Patent—

1. The herein-described process of making slag cement, which consists in forming a mixture of ground slag, slaked lime and water, and allowing it to set or harden, then roasting such set or hardened mixture and reducing the same to a powder, and then mixing the said powder in the proper proportions with ground slag and slaked lime, substantially as described.

2. The herein-described composition of matter for slag cement, consisting of ordinary slag cement, which is composed of ground slag and slaked lime, and a roasted and powdered mixture of ground slag, slaked lime and water, substantially as described.

In testimony that I claim the foregoing as my invention I have signed my name in presence of two subscribing witnesses.

SOPHUS JORGENSEN.

Witnesses:
  I. HOFMAN BAUG,
  G. OLSEN HANGE.